3,833,668
DIMETHYL ACETAL OF 1-(2,4-DI-SEC-BUTYLPHENOXY)-2-PROPANONE
Chester E. Pawloski, Bay City, Mich., assignor to The Dow Chemical Company, Midland, Mich.
No Drawing. Filed Mar. 5, 1973, Ser. No. 337,864
Int. Cl. C07c 43/20
U.S. Cl. 260—613 D      1 Claim

ABSTRACT OF THE DISCLOSURE

The invention relates to the dimethyl acetal of 1-(2,4-di-sec-butylphenoxy)-2-propanone having useful pharmacological properties as determined by the reduction of cholesterol in the blood of mammals.

SUMMARY OF THE INVENTION

The present invention is directed to a new compound corresponding to the formula:

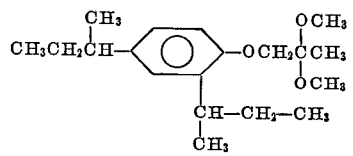

having utility as a hypocholesteremic agent in mammals.

DETAILED DESCRIPTION

The active dimethyl acetal of 1-(2,4-di-sec-butylphenoxy)-2-propanone compound of the present invention (hereinafter referred to as the "propanone compound") is a liquid which is of low solubility in water and is somewhat soluble in many organic solvents useful as pharmaceutical carriers.

In a representative operation, the propanone compound of the present invention was prepared by adding 2,4-di-sec-butylphenyl-2-propynyl ether (46 grams; 0.24 mole) in 50 milliliters (ml.) of methanol to a boron trifluoride etherate (3 mls.), and methanol (150 ml.) mixture containing 1 gram of red mercuric oxide and 1 crystal of trichloroacetic acid at a temperature of about 50° C. The 2,4-di-sec-butylphenyl-2-propynyl ether was added dropwise, with agitation of the mixture, to the mixture over a period of about 90 minutes. The resulting reaction mixture was then heated at a temperature of from about 60–65° C. for a period of about 4 hours and then allowed to stand at ambient temperatures for a period of about 16 hours. A small amount of $Na_2CO_3$ was added to the mixture and the mixture filtered and subsequently distilled. As a result of these operations, the desired dimethyl acetal of 1-(2,4-di-sec-butylphenoxy)-2-propanone compound was obtained as an amber oily liquid having a refractive index ($n_D^{22}$) of 1.4890.

The starting materials employed in preparing the propanone compound are commercially available or may be prepared according to known or analogous methods known in the art.

The propanone compound, when administered internally, i.e., enternally or parenterally, to mammals in a hypocholesteremic amount has the effect of lowering the blood cholesterol content, that is, the amount of cholesterol in the blood serum of the animal. The propanone compound has particularly been found to bring about a substantial lowering of serum cholesterol when administered orally to animals in the form of orally-ingestible compositions. A hypocholesteremic amount of the propanone compound is that amount which effectuates a substantial reduction of serum cholesterol levels in the animal adminstered the compound. Whether or not sufficient of the propanone compound is administered under particular circumstances can be ascertained by the conventional procedure of measuring serum cholesterol levels of animals administered the propanone compound and comparing the results with the cholesterol levels observed in similar untreated animals. Whether or not a reduction is regarded as substantial depends on a variety of factors such as the result desired, the species of animal and variations in cholesterol levels occurring in untreated animals.

The hypocholesteremic amount of the propanone compound to be administered to an animal, that is, the amount which is effective to substantially lower the serum cholesterol level, can vary depending upon such factors as the size, weight and age of the animal treated, the desired serum cholesterol level to be obtained, whether or not the animal is hypercholesteremic (e.g., whether or not the original cholesterol level is above normal), the period of administration and the method of administration. The propanone compound can be administered in a hypocholesteremic amount of from about 1 milligram to about 1 gram per kilogram. It can be administered orally in single doses or repeated multiple doses; if desired, injectable compositions comprising the propanone compound may be utilized for intraperitoneal injection. In general, the propanone compound is administered in daily oral dosages of from about 1 to about 5 milligrams to about 1000 milligrams of the active compound per kilogram of body weight of the animal to be treated.

The propanone compound is preferably administered as a composition in dosage unit form. Such compositions can be prepared by known techniques and preferably contain from about 1 to about 1000 milligrams of the active compound. The compound can also be administered in compositions adapted to be fed as part or all of the animal diet. Examples of suitable unit dosage forms are tablets, capsules, pills, powder packets, wafers, cachets, granules, solutions or suspensions for oral or sterile injectable use, suppositories, and segregated multiples of any of the foregoing, and other forms alluded to herein.

The compositions are prepared by incorporating the active propanone compound in a non-toxic pharmaceutical carrier. The term "non-toxic carrier" refers to conventional excipients and includes nutritive compositions such as a solid or liquid foodstuff. The term "foodstuff" refers to non-toxic carriers whch are not only non-toxic and non-sensitizing, but which are also digestible and otherwise utilizable in the animal metabolism. In the formulations of the propanone compound, the non-toxic carrier employed cooperates with the active ingredient to prepare a desirable composition for administration and to release and disperse a hypocholesteremic amount of the active ingredient within the animal body after administration. Particular non-toxic carriers can be selected by conventional procedures to prepare compositions which can vary somewhat in physical form, oral acceptance by animals (palatability), onset and duration of hypocholestermic activity and the like.

The identity of the pharamceutical carriers which are used in formulating the propanone compound into dosage forms which are suitable for enteral or parenteral administration will be immediately apparent to those skilled in the art. Suitable pharmaceutical carriers are described in "Remington's Pharmaceutical Sciences" (14th Ed.) by E. W. Martin, a well-known reference text in this field.

Acceptable formulations for oral use can be prepared in the usual manner to provide an aqueous suspension, an elixir or a solid dosage unit form (e.g., tablet, powder or capsule, for example, two-piece hard gelatin capsules may be filled with a mixture of the active ingredient and excipient (e.g., starch, talc, stearic acid, and/or magnesium stearate). Also, one piece gelatin capsules containing the same amount of medicament may be prepared using sufficient corn oil or other suitable vegetable oil, to render the compound capsulatable. Tablets may be prepared by using starch, lactose or other conventional excipients, and may be scored to enable the administration of fractional dosages, if desired. Any of the tableting material used in pharmaceutical practice may be employed. Liquid preparations may be in the form of suspensions, emulsions, syrups or elixirs of the active substance in water or other liquid medium commonly used for making orally acceptable pharmaceutical formulations, such as liquid paraffin, or a syrup elixir base. Such formulations can contain from about 0.02 to about 95 or more weight percent, usually from about 0.1 to about 50 weight percent, of active ingredient based on the total weight of the dosage form, there being enough active ingredient to provide an amount within the dosage levels stated above.

The active substance may also be made up in a form suitable for parenteral administration, i.e., as a suspension in sterile water or an organic liquid usually employed for injectable preparations, for example a vegetable oil such as olive oil, or a sterile solution in an organic solvent. Such formulations can contain from about 0.02 to about 95 or more weight percent, usually form about 0.1 to about 25 weight percent, of active ingredient based on the total weight of the dosage form, there being enough active ingredient to provide an amount within the dosage levels stated above.

The active ingredient can also be incorporated in a nutritive foodstuff such as, for example, butter, margarine, edible oils, carbohydrates and the like. Such nutritive compositions are adapted to be administered as a partial or total diet or as a supplement to the diet. Such compositions preferably contain from about 0.02 or less to about 2.0 or more percent of the active ingredient when administered as the total diet. The compositions can contain higher concentrations of the active ingredient when administered as a supplement.

Moreover, preservatives, stabilizers, wetting agents, buffers, and the like can be incorporated, if desired, into the above formulations. Additionally, the formulations may also contain other therapeutically valuable substances such as other complementary hypolipidemic, hypocholesteremic or hypoglycerin agents as well as vitamins, analgesics, androgens, and the like compatible with the present compound can be included in the present formulations to secure advantageous combination therapy.

The propanone compound of the present invention can also be formulated as a concentrate composition which is adapted to be diluted by admixture with liquid or solid foodstuffs. Such concentrated compositions are preferably prepared by mixing the active propanone compound with a finely divided inert solid carrier such as silica gel, talc, chalk or the like or a finely divided foodstuff such as casein, sugar or the like, or mixtures thereof. The concentrated compositions can also include additional ingredients such as water-soluble vitamins, fat-soluble vitamins, proteins, amino acids, carbohydrates and the like.

In a representative operation, one part of the dimethyl acetal of 1-(2,4-di-sec-butylphenoxy)-2-propanone compound is mixed with three parts of silica gel and the resulting mixture is dried to obtain a concentrated composition containing 25 percent of the active propanone compound. A portion of the concentrate composition is employed to prepare a nutritive composition by intimately mixing 0.5 part of the concentrated composition with 99.5 parts of standard animal feed on a conventional roller mill. There is thus obtained a nutritive composition suitable for oral administration to animals for the purpose of lowering serum cholesterol levels. The composition is adapted to be fed as the entire animal diet.

In substantially the same procedure as described above, separate portions of balanced rodent mash and a concentrate composition are mixed together to prepare a composition containing 0.12 percent by weight of the dimethyl acetal of 1-(2,4-di-sec-butylphenoxy)-2-propanone compound. Separate groups of male mice of the same origin and past history were fed for two weeks on separate diets consisting of the above-described composition. A separate group of check mice was similarly fed for two weeks on a similar diet which contained none of the propanone compound to serve as a check. At the end of the two week period, the mice were exsanguinated under anesthesia. Serum cholesterol was determined by taking a 0.05 milliliter aliquot of serum from each mouse and adding the aliquot to 3 milliliters of a 0.08 percent solution of ferric chloride in pure acetic acid. The serum was mixed with the ferric chloride-acetic acid solution and allowed to stand for 10 to 15 minutes to flocculate protein. The protein was precipitated by centrifugation and the clear supernatant was transferred to a stoppered test tube. Two milliliters of sulfuric acid were added to the supernatant and mixed well. The tubes were then left to stand exposed to air for 20 to 30 minutes. Serum cholesterol was determined by measuring percent transmission at a wave length of 560 millimicrons in a spectrophotometer and comparing the percent transmission to that observed with solutions containing known amounts of cholesterol. The serum cholesterol level found in the check group of mice was used as the basis for calculating percentage reduction of cholesterol. A 37 percent reduction of the serum cholesterol level was obtained with the dimethyl acetal of 1-(2,4-di-sec-butylphenoxy)-2-propanone compound employed at the dosage rate of 0.12 percent of the diet.

I claim:

1. Dimethyl acetal of 1-(2,4-di-sec-butylphenoxy)-2-propanone.

References Cited

UNITED STATES PATENTS

| 2,553,555 | 5/1951 | Drake | 260—613 D |
| 3,362,997 | 1/1968 | Bolhofer | 260—613 D X |

BERNARD HELFIN, Primary Examiner

U.S. Cl. X.R.

424—341